United States Patent [19]

Lester

[11] 4,053,061

[45] Oct. 11, 1977

[54] MOBILE CRANE

[75] Inventor: Robert James Lester, Cleadon near Sunderland, England

[73] Assignee: Coles Cranes Limited, Sunderland, England

[21] Appl. No.: 618,859

[22] Filed: Oct. 2, 1975

[30] Foreign Application Priority Data

Oct. 5, 1974 United Kingdom ............... 43296/74

[51] Int. Cl.[2] ............................................... B62D 27/00

[52] U.S. Cl. ................................ 212/58 R; 180/77 S; 212/55

[58] Field of Search ......................... 214/660, 670–674; 296/28 C; 212/28, 46 R, 55, 58 R; 180/77 S, 89 R; 187/9 R

[56] References Cited

U.S. PATENT DOCUMENTS

| | | | |
|---|---|---|---|
| 3,085,644 | 4/1963 | Van Der Lely | 180/77 S |
| 3,265,149 | 8/1966 | Schuetz | 180/77 S |
| 3,398,984 | 8/1968 | Ajero | 180/77 S X |
| 3,452,888 | 7/1969 | Larson et al. | 214/147 R X |
| 3,891,264 | 6/1975 | Hunter et al. | 296/28 C |
| 3,933,224 | 1/1976 | Nilsson et al. | 187/9 R |

FOREIGN PATENT DOCUMENTS

| | | | |
|---|---|---|---|
| 2,103,278 | 12/1971 | Germany | 296/28 C |
| 2,046,552 | 4/1971 | Germany | 180/77 S |
| 1,932,955 | 1/1971 | Germany | 180/77 S |
| 1,022,623 | 3/1966 | United Kingdom | 180/77 S |

*Primary Examiner*—Robert J. Spar
*Assistant Examiner*—R. B. Johnson
*Attorney, Agent, or Firm*—Sughrue, Rothwell, Mion, Zinn and Macpeak

[57] ABSTRACT

A rough terrain mobile crane in which the operator's control cab is mounted on a rotatable superstructure has sets of controls for vehicular drive, steering, lifting and boom motions grouped together in the control cab which is carried on a bearing provided on the superstructure together with the boom and pivotally connected hydraulic ram for raising and lowering it and the control cab is alternatively extended to a forward position at the front of the chassis and which may be beside an upstanding engine compartment for driving the crane from place to place and to a rearward position, by sliding and/or pivoting on the bearing, for use in operation of the crane.

1 Claim, 3 Drawing Figures

MOBILE CRANE

BACKGROUND OF THE INVENTION

Figure 1:
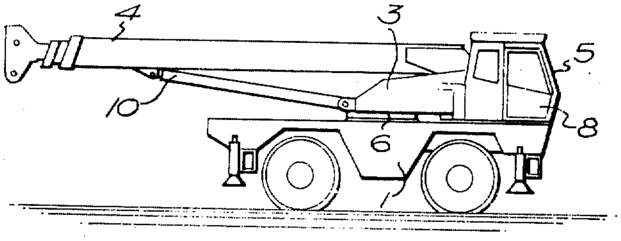

This invention relates to mobile cranes of the type known as "rough terrain" cranes in which the operator's cab is mounted on a crane superstructure rotatably carried on a vehicle chassis.

Prior to this rough terrain cranes had a control cab mounted on the vehicle chassis, giving the driver good control and highway visibility in moving the crane from place to place but rendering operation of the crane difficult and often hazardous as the operator often has to look over his shoulder away from the crane controls to see as much of the working area as is not obscured by the crane superstructure.

Mobile cranes of the type referred to have been proposed having two separate control cabs, one mounted on the chassis with vehicle controls only for use in moving the crane and the crane control cab having sufficient duplicated controls for low-speed manoeuvering of the crane in use. Such cranes necessarily have a long wheelbase for permitting rotation of the superstructure with clearance from the chassis control cab.

It has also been proposed to provide two control cabs, in "back to back" formation centrally of a chassis with the crane controls in the cab facing the crane boom and the vehicle control cab facing the opposite direction with forward vision over the front part of the chassis for highway driving. A long wheelbase is required unless the chassis deck level can conveniently be raised above the engine in order that the vehicle control cab may swing over the engine area.

SUMMARY OF THE INVENTION

An object of the present invention is to provide a roadworthy rough terrain type mobile crane for operation with safety from a single control cab affording clear visibility respectively of road and working area.

According to the invention a mobile crane comprises a crane superstructure with a boom rotatably carried on a vehicle chassis mounted on road wheels and sets of controls respectively for vehicular drive and steering and for lifting and boom motions, having a control cab mounted on the superstructure for rotation with it and in which a bearing on the superstructure carries the control cab for alternative extension in opposed directions with respect to the chassis, the sets of controls are grouped together in the control cab and an hydraulic ram for raising and lowering the boom about the superstructure is pivotally connected to the boom and to the superstructure, the control cab being locatable in alternative positions respectively at the front of the chassis for use in driving the crane from place to place and rearwardly thereof for use in operation of the crane.

For highway travel, the control cab is swung round from the craning position through approximately 180° to a position where it is facing to the front providing optimum visibility for the operator. Since all major controls for both craning and travelling are located in the cab, the facility for manoeuvering the vehicle while craning is automatically provided without duplication of equipment.

The cab is provided with a door on each side to give ready access in both operating positions. The movable carriage of the cab permits it to be positioned alongside the engine compartment when in the road travel mode, since no rotation movement of the superstructure is necessary in this position, nor is this desirable and is normally provided to prevent accidental rotation of cab and superstructure when the crane is in road travel configuration. The ability to locate the cab alongside the engine when in the road travel position allows the use of a short wheelbase, low overall height and improved weight distribution without limiting the size or type of engine installation to that which can be accommodated below chassis deck level.

Figure 2:
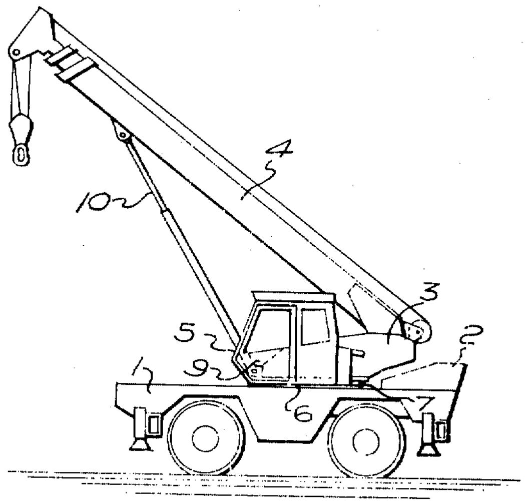
Figure 3:
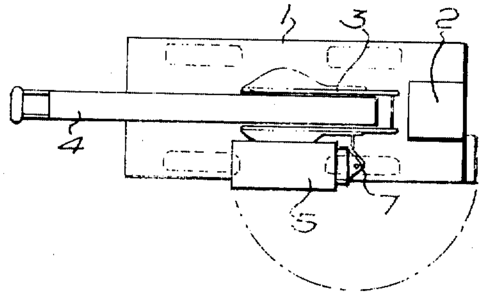

The invention will be further described by way of example with reference to the accompanying drawings in which:

FIG. 1 is a side elevation of a rough terrain mobile crane in accordance with the invention in the road travel mode, FIG. 2 is a side elevation of the crane of FIG. 1 in a craning position and FIG. 3 is a plan of the crane, with its control cab moved into craning position from the road travel position.

A vehicle chassis 1 has an engine compartment 2 with transmission and running gear at the centre front and carries a crane superstructure 3 complete with boom 4 and control cab 5. The superstructure 3 is rotatable as a turntable relative to the chassis 1 about a vertical axis 6 at approximately mid length of the chassis and on the longitudinal centre line.

For crane operation the cab 5 is located in a position where it permits full rotation of the superstructure 3 without obstruction by the engine compartment 2 and facing one direction of the boom 4.

When the crane is prepared for road travel the crane superstructure 3 is rotated in line with the chassis 1 with the boom 4 pointing over the rear and locked in this position by means of a pin or other normal swing locking device. The cab 5 is then unlocked from its crane operating position on the superstructure 3 and swung round on a pivot mounting 7 to the rear of the cab 5 into a position wherein it faces towards the front of the chassis, and lies adjacent the engine compartment 2 where it is again locked. The physical motion of the cab to this position is used also to actuate an interlock to prevent operation of the crane motions, in particular the rotation drive, until such time as the cab 5 is returned to the crane operating position. this interlock is in the form of a microswitch controlling a solenoid valve in the crane hydraulic system and other similar devices may be provided for interlocking control systems.

Door 8 gives access at the side of the chassis 3 to the cab 5 in the road travel mode and door 9 permits free access during craning.

For rough terrain cranes fitted with superstructure cabs, the method of steering control during craning operations employing hydraulic ram 10 for raising the boom 4 is normally hydraulic. This system may also be used for road travel steering but a fail-safe mehcanical link between steering wheel and road wheels is preferred for highway travel.

Hydraulic steering for use in crane operation is provided in conjunction with power assisted mechanical steering for highway operation when the cab is located facing front in the road travel mode.

What I claim is:

1. A mobile crane comprising a wheel supported vehicle chassis having a front end and a rear end, an engine compartment mounted on said chassis at said front end, a boom support structure, pivot means for mounting said boom support structure on said chassis for rotation about a vertical axis located on the longitudinal axis at the mid section of said chassis, an extensible boom having a first end and a second end with a load hoist mechanism mounted at said second end, pivot means mounting said first end to said boom support structure for movement about a horizontal axis, means extending between said extensible boom and said boom support structure for pivoting said extensible boom about said horizontal axis, an operator's control cab, vertical pivot means mounting said control cab at one end thereof to said boom support structure at one side of the latter such that said control cab is pivotable about said vertical pivot means from a craning position in which said control cab is disposed parallel to said extensible boom and facing said load hoist mechanism to a moble crane travel position in which said control cab is located adjacent said engine compartment and faces in a direction that is 180° from said craning position and access means on said control cab so as to provide entry thereto from a single side of the vehicle when said control cab is in either said craning or travel position.

* * * * *